US012624941B2

(12) United States Patent
Kang et al.

(10) Patent No.:　US 12,624,941 B2
(45) Date of Patent:　May 12, 2026

(54) ROLLER GAP MEASUREMENT SYSTEM USING LIGHT AND ROLLER GAP MEASUREMENT METHOD USING SAME

(71) Applicants: KOREA INSTITUTE OF MACHINERY & MATERIALS, Daejeon (KR); KOREA ADVANCED INSTITUTE OF SCIENCE AND TECHNOLOGY, Daejeon (KR)

(72) Inventors: Dongwoo Kang, Daejeon (KR); Hong Ki Yoo, Daejeon (KR); Jin Su Choi, Daejeon (KR); Hyunchang Kim, Sejong (KR); Seung-Hyun Lee, Daejeon (KR); Kyung-Rok Kim, Daejeon (KR); Jaeyoung Kim, Daejeon (KR)

(73) Assignees: KOREA INSTITUTE OF MACHINERY & MATERIALS, Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 126 days.

(21) Appl. No.: 18/696,040

(22) PCT Filed: May 11, 2023

(86) PCT No.: PCT/KR2023/006438
§ 371 (c)(1),
(2) Date: Mar. 27, 2024

(87) PCT Pub. No.: WO2023/219448
PCT Pub. Date: Nov. 16, 2023

(65) Prior Publication Data
US 2024/0384982 A1　　Nov. 21, 2024

(30) Foreign Application Priority Data
May 12, 2022　(KR) ........................ 10-2022-0058341

(51) Int. Cl.
*G01B 11/14*　(2006.01)
*B21B 38/10*　(2006.01)

(52) U.S. Cl.
CPC .............. *G01B 11/14* (2013.01); *B21B 38/10* (2013.01)

(58) Field of Classification Search
CPC ......... G01B 11/14; G01B 21/16; B21B 37/00; B21B 37/16; B21B 37/18; B21B 37/58;
(Continued)

(56) References Cited

U.S. PATENT DOCUMENTS

| | | | | | |
|---|---|---|---|---|---|
| 2,332,289 | A | * | 10/1943 | Zeitlin | .................... B21B 38/00 250/206 |
| 3,640,109 | A | * | 2/1972 | Ashton | ................. B21B 39/165 72/428 |

(Continued)

FOREIGN PATENT DOCUMENTS

| | | | | | |
|---|---|---|---|---|---|
| CN | | 115388794 | A | * | 11/2022 ............. G01S 7/481 |
| DE | | 3923275 | A | * | 1/1991 |

(Continued)

OTHER PUBLICATIONS

Search Report for international Application No. PCT/KR2023/006438 dated Aug. 21, 2023.

(Continued)

*Primary Examiner* — Gordon J Stock, Jr.
(74) *Attorney, Agent, or Firm* — LEX IP MEISTER, PLLC

(57) ABSTRACT

In a roller gap measurement system and a roller gap measurement method using the roller gap measurement system, the roller gap measurement system includes a light source, a refractive part, a sensor part and an image processing part. The light source is configured to provide an incident light toward the gap between first and second rollers. The refrac-
(Continued)

tive part is configured to receive a complex light passing through the gap between the first and second rollers, and configured to refract the complex light. The sensor part is configured to receive the refracted light and configured to image a complex pattern. The image processing part is configured to obtain a gap information between the first and second rollers, based on the imaged complex pattern.

18 Claims, 9 Drawing Sheets

(58) Field of Classification Search
    CPC ....... B21B 38/00; B21B 38/10; B21B 38/105;
                B65H 3/5261; B65H 3/06; B65H 3/062;
                B65H 2220/01; B65H 7/06; B65H 7/14;
                B29C 48/92; B29C 43/46; B29C 59/04;
                B30B 3/00; B30B 3/04; B30B 3/005;
                B30B 3/02; B30B 11/006; D21F 3/08
    See application file for complete search history.

(56)                    References Cited

U.S. PATENT DOCUMENTS

| 3,809,907 | A | * | 5/1974 | Schuller | ................. | G01B 11/00 |
| | | | | | | 250/548 |
| 4,548,503 | A | * | 10/1985 | Liesch | .................... | B21B 38/00 |
| | | | | | | 356/621 |
| 4,821,544 | A | * | 4/1989 | Tamler | ................... | G01B 11/14 |
| | | | | | | 72/10.7 |
| 5,796,856 | A | * | 8/1998 | Graff | ..................... | G01B 11/14 |
| | | | | | | 250/901 |
| 7,172,720 | B2 | * | 2/2007 | Nissel | ..................... | B29C 48/08 |
| | | | | | | 264/409 |
| 10,286,434 | B2 | * | 5/2019 | Haverkamp | ............ | B21B 31/16 |
| 2015/0300800 | A1 | | 10/2015 | VanValkenburgh et al. | | |

FOREIGN PATENT DOCUMENTS

| JP | | S6228018 | A | * | 2/1987 | | |
| JP | | H06147843 | A | * | 5/1994 | ............ | B21B 38/10 |
| JP | | H07121914 | A | * | 5/1995 | | |
| JP | | 3072805 | B2 | * | 8/2000 | | |
| JP | | 2000334810 | A | * | 12/2000 | ............ | B29C 48/08 |
| JP | | 2004020482 | A | | 1/2004 | | |
| JP | | 2005004000 | A | * | 1/2005 | | |
| JP | | 2006-058090 | A | | 3/2006 | | |
| JP | | 2006-116835 | A | | 5/2006 | | |
| JP | | 2008246496 | A | * | 10/2008 | | |
| JP | | 2009-265054 | A | | 11/2009 | | |
| JP | | 5448303 | B2 | * | 3/2014 | | |
| JP | | 5690268 | B2 | | 3/2015 | | |
| JP | | 2018044771 | A | * | 3/2018 | | |
| JP | | 2018066573 | A | * | 4/2018 | | |
| JP | | 2020-193842 | A | | 12/2020 | | |
| JP | | 2020197495 | A | | 12/2020 | | |
| KR | | 102523049 | B1 | | 4/2023 | | |
| TW | | 473407 | B | * | 1/2002 | ............ | B21B 31/16 |

OTHER PUBLICATIONS

Written Opinion for international Application No. PCT/KR2023/006438 dated Aug. 21, 2023.

* cited by examiner

Figure 8:
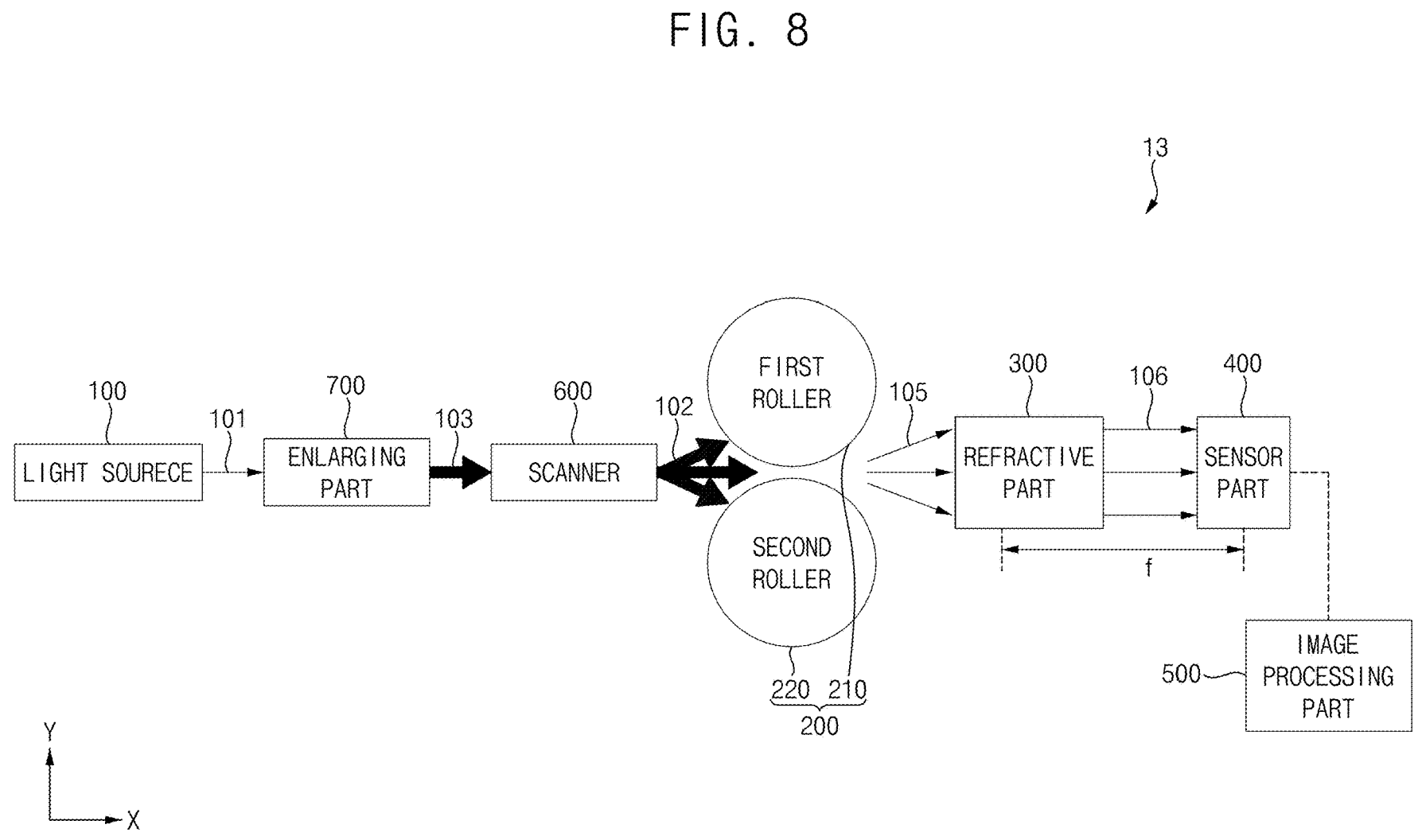

LIGHT SOURECE 100

101

ENLARGING PART 700

103

SCANNER 600

102

FIRST ROLLER

SECOND ROLLER

105

220 210
200

REFRACTIVE PART 300

106

SENSOR PART 400 f

IMAGE PROCESSING PART 500

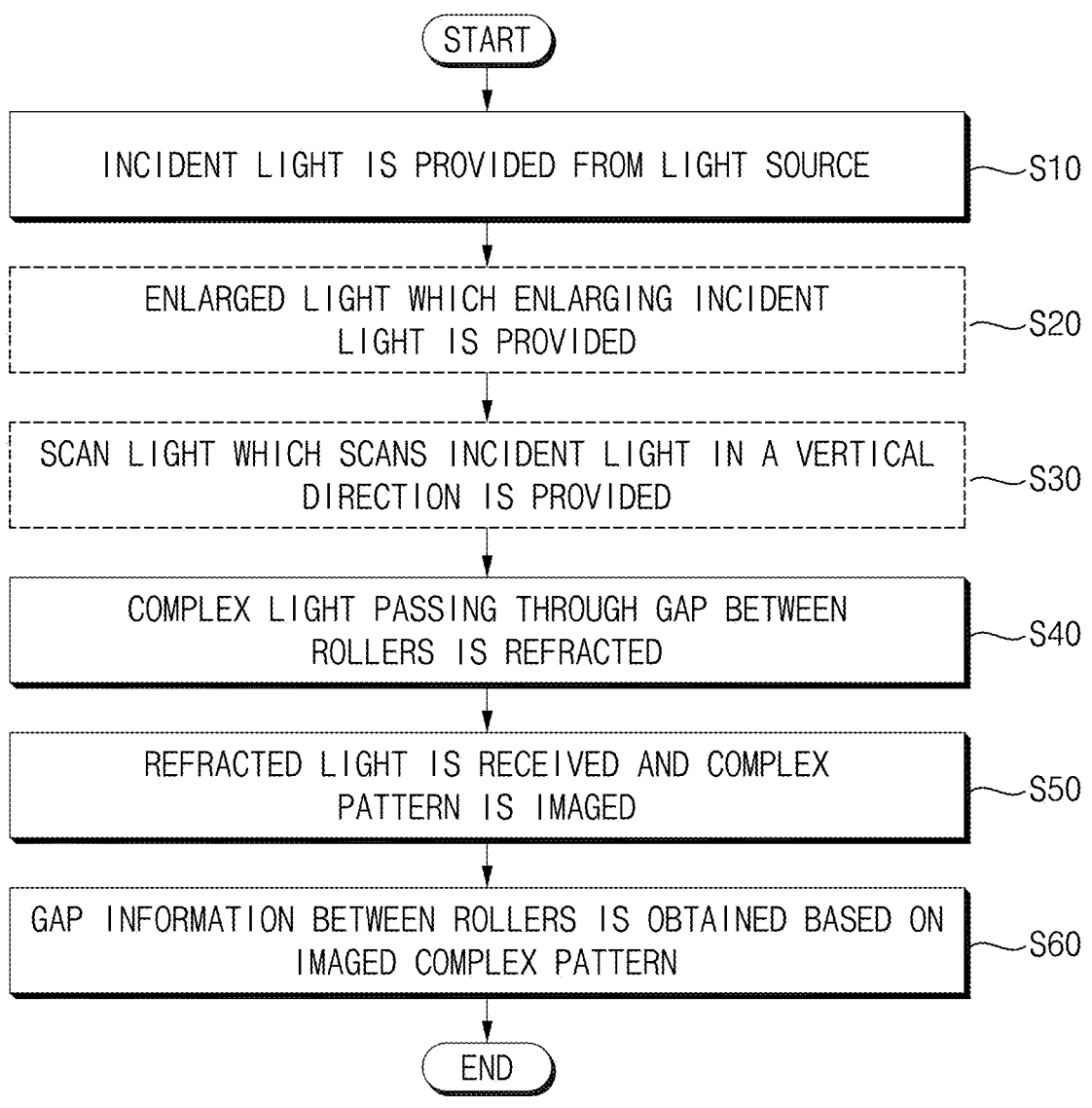

START

INCIDENT LIGHT IS PROVIDED FROM LIGHT SOURCE — S10

ENLARGED LIGHT WHICH ENLARGING INCIDENT
LIGHT IS PROVIDED — S20

SCAN LIGHT WHICH SCANS INCIDENT LIGHT IN A VERTICAL
DIRECTION IS PROVIDED — S30

COMPLEX LIGHT PASSING THROUGH GAP BETWEEN
ROLLERS IS REFRACTED — S40

REFRACTED LIGHT IS RECEIVED AND COMPLEX
PATTERN IS IMAGED — S50

GAP INFORMATION BETWEEN ROLLERS IS OBTAINED BASED ON
IMAGED COMPLEX PATTERN — S60

END

ROLLER GAP MEASUREMENT SYSTEM USING LIGHT AND ROLLER GAP MEASUREMENT METHOD USING SAME

BACKGROUND

1. Field of Disclosure

The present disclosure of invention relates to a roller gap measurement system and a roller gap measurement method using the roller gap measurement system, and more specifically the present disclosure of invention relates to a roller gap measurement system using a light and a roller gap measurement method using the roller gap measurement system, in which the roller gap in a roll-to-roll equipment is measured in a non-contact manner using a complex interference pattern generated when the light passes through the gap between rollers.

2. Description of Related Technology

Generally, in rollers used in a roll-to-roll processing equipment, it is important to maintain a constant gap between the rollers in order to maintain a constant thickness of a transported workpiece. Thus, technology to accurately measure the gap between the rollers is required.

Regarding the technologies to measure the gap between the rollers, Japanese laid-open patent No. 2009-265054 disclosed the technology to measure the gap between the rollers using a dial gauge.

In addition, Japanese laid-open patent No. 2006-058090 disclosed the technology of contact type gap measurement in which an expandable measuring unit is inserted into a gap between the rollers to measure the gap.

However, recently, as the demand for the roll-to-roll processing for relatively thin workpieces increases, the gap between the rollers is also narrowing. Thus, the demand for the technology for measuring the narrowing gap accurately is more increasing.

In addition, as the gap narrows, it is difficult to apply conventional contact measurement technologies or measurement technologies using a separate measurement unit. Then, the development of new measurement technologies is required.

Related prior arts are Japanese laid-open patent No. 2009-265054 and Japanese laid-open patent No. 2006-058090.

SUMMARY

The present invention is developed to solve the above-mentioned problems of the related arts. The present invention provides a roller gap measurement system using a light, capable of measuring not only relatively narrow gaps but also gaps in a central portion of a roller accurately, by measuring a roller gap in a roll-to-roll equipment in a non-contact manner using a complex interference pattern generated when the light passes through the gap between the rollers.

In addition, the present invention also provides a roller gap measurement method using the roller gap measurement system.

According to an example embodiment, the roller gap measurement system is configured for measuring a gap between a pair of first and second rollers. The system includes a light source, a refractive part, a sensor part and an image processing part. The light source is configured to provide an incident light toward the gap between the first and second rollers. The refractive part is configured to receive a complex light passing through the gap between the first and second rollers, and configured to refract the complex light. The sensor part is configured to receive the refracted light and configured to image a complex pattern. The image processing part is configured to obtain a gap information between the first and second rollers, based on the imaged complex pattern.

In an example, the light source may be configured to provide a monochromatic laser.

In an example, the incident light provided from the light source may be diffracted, transmitted, reflected or scattered with passing through the gap between the first and second rollers, and may be formed as the complex light.

In an example, the sensor part may be located spaced apart from the refractive part by a focal length of the refractive part.

In an example, the image processing part may include a feature extracting part configured to extract features of a pattern from the imaged complex pattern, a parameter input part configured to receive parameters affecting the complex pattern, except for the gap, an analysis part configured to obtain the features of the pattern due to the gap from the extracted pattern, considering an effect by the parameters, and a decision part configured to obtain the gap information, based on the obtained pattern features.

In an example, the feature extracting part may be configured to extract the features of an interference pattern via a frequency analysis on the imaged complex pattern, configured to extract the features based on an intensity ratio between a central portion of the imaged complex pattern and a side portion of the imaged complex pattern on the imaged complex pattern, or configured to extract the features based on a sum of intensity on the imaged complex pattern.

In an example, the parameters except for the gap may be pre-known values which are uniformly maintained without being changed.

In an example, the effect of the parameters except for the gap on the extracted pattern may be pre-analyzed and stored. The analysis part may be configured to obtain the features of the pattern due to the gap, considering the pre-analyzed and stored effect.

In an example, the parameters may include at least one of an alignment error between the first and second rollers, a radius of each of the first and second rollers, a deformation error and a surface roughness.

In an example, the gap information obtained in the decision part may be an absolute value information or a relative value information on a size of the gap.

In an example, the system may further include a scanner disposed between the light and the first and second rollers, and configured to scan the incident light and to provide a scan light.

In an example, the scanner may be configured to provide the scan light in which the incident light is scanned along a direction perpendicular to an advancing direction of the incident light. An information on the difference between a single slit model and an actual gap between the first and second rollers may be obtained according as the scan light is provided.

In an example, the scanner may include a pair of first and second lenses, each of which is a convex lens. The incident light may pass through the first and second lenses to be a scan light.

In an example, the system may further include an enlarged part disposed between the light source and the first and second rollers, and configured to enlarge the incident light to provide an enlarged light.

In an example, the enlarged light may be provided when the gap between the first and second rollers is larger than a size of the light source.

In an example, the first and second rollers may be rollers used in a roll-to-roll processing, and a process product may be continuously provided through the gap between the first and second rollers.

According to another example embodiment, in a roller gap measurement method, an incident light is provided toward a gap between first and second rollers from a light source. A complex light passing through the gap between the first and second rollers is received and refracted. The refracted light is received and a complex pattern is imaged. A gap information between the first and second rollers is obtained based on the imaged complex pattern.

In an example, the method may further include providing a scan light to the gap between the first and second rollers. The incident light may be scanned along a direction perpendicular to an advancing direction of the incident light to be the scan light.

In an example, the method may further include providing an enlarged light to the gap between the first and second rollers. The incident light may be enlarged to be the enlarged light.

According to the present example embodiments, by measuring the gap between a pair of rollers in a non-contact method, accurate and effective measurement is possible even when the gap between the rollers is relatively very narrow. In particular, the gap in the center of the rollers may be effectively measured, and the gap in the center of the rollers, which affects the thickness of the workpiece that actually passes between the rollers, may be effectively controlled.

Here, assuming that the gap between the rollers is a single slit model, information on the gap is derived based on the complex pattern of the light passing through the single slit. Accurate gap measurement may be possible using the non-contact method.

In addition, the gap information may be obtained by extracting features from the complex pattern, but by taking into account the effects of various parameters that affect the actual complex pattern, the gap information may be obtained directly from the features of the complex pattern.

In other words, by considering and excluding in advance the influence of parameters other than the gap on the complex pattern, the features of the complex pattern according to the difference in the gap may be derived, and the gap information may be obtained based on this. Thus, from the features of the complex pattern that varies due to differences in a fine gap, the fine gap information may be obtained more accurately.

In addition, by scanning the incident light and providing the scan light between the rollers, if there is a difference between the assumed single slit model and the actual gap, information about the gap may be obtained more accurately.

Furthermore, by providing enlarged light between the rollers through the enlarging part, information about the gap between the rollers may be obtained even when the gap between the rollers is larger than the size of the light source. Thus, gap information may be obtained for gaps of various sizes using the single light source.

4

BRIEF DESCRIPTION OF THE DRAWINGS

FIG. 5 is a schematic view illustrating a roller gap measurement system according to another example embodiment of the present invention;

FIG. 7 is a schematic view illustrating a roller gap measurement system according to still another example embodiment of the present invention;

FIG. 8 is a schematic view illustrating a roller gap measurement system according to still another example embodiment of the present invention; and FIG. 9 is a flow chart illustrating a roller gap measurement method using the roller gap measurement systems of FIG. 1, FIG. 5, FIG. 7 and FIG. 8.

Figure 1:
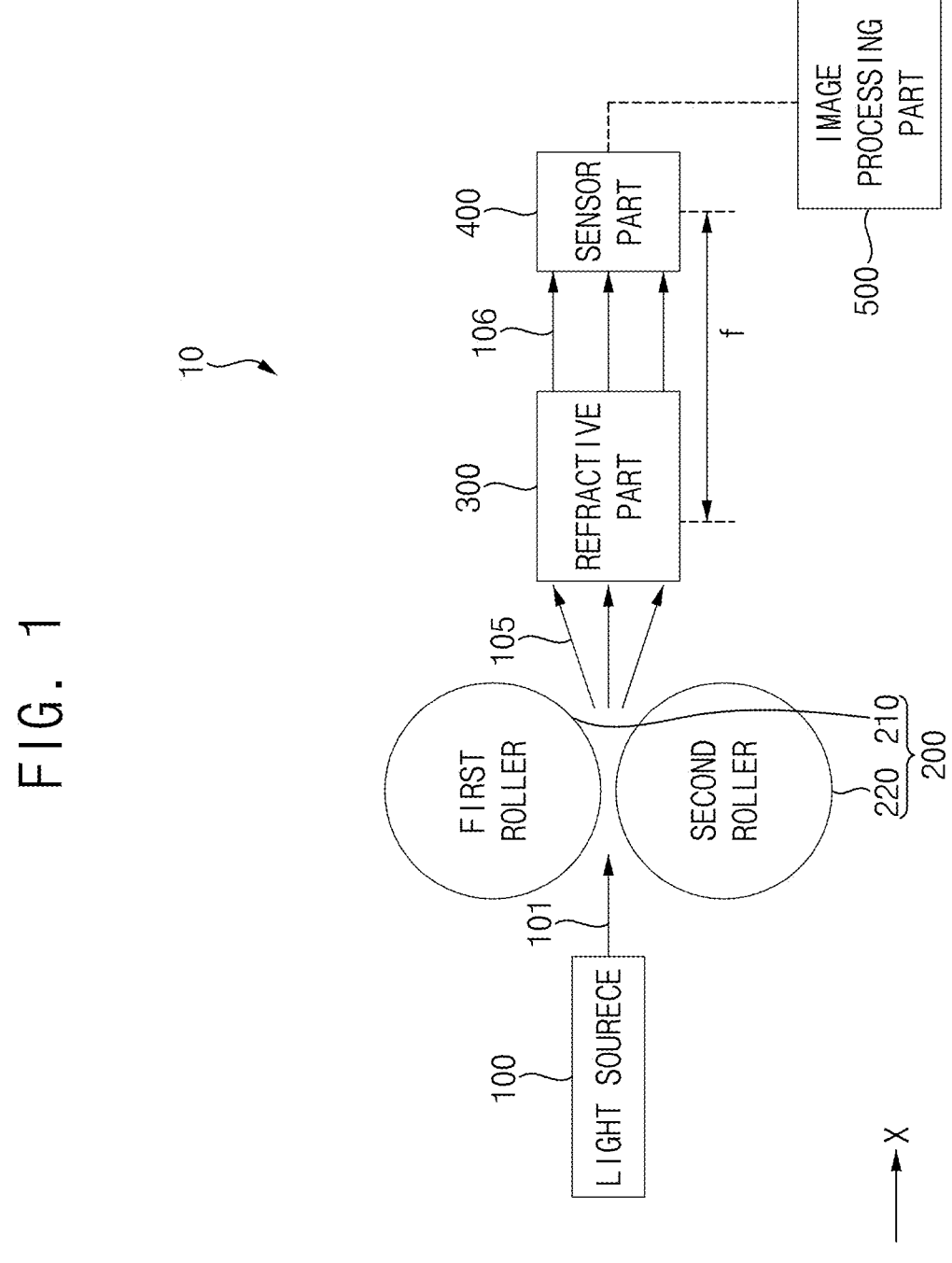
FIG. 1 is a schematic view illustrating a roller gap measurement system according to an example embodiment of the present invention.

| * Reference numerals | |
| --- | --- |
| 10, 11, 12, 13: roller gap measurement system | |
| 100: light source | 101: incident light |
| 102: scan light | 103: enlarged light |
| 105: complex light | 106: refractive light |
| 200: roller part | 210: first roller |
| 220: second roller | 300: refractive part |
| 400: sensor part | 500: image processing part |
| 510: feature extracting part | 520: parameter input part |
| 530: analysis part | 540: decision part |
| 600: scanner | 700: enlarged part |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

Figure 2:
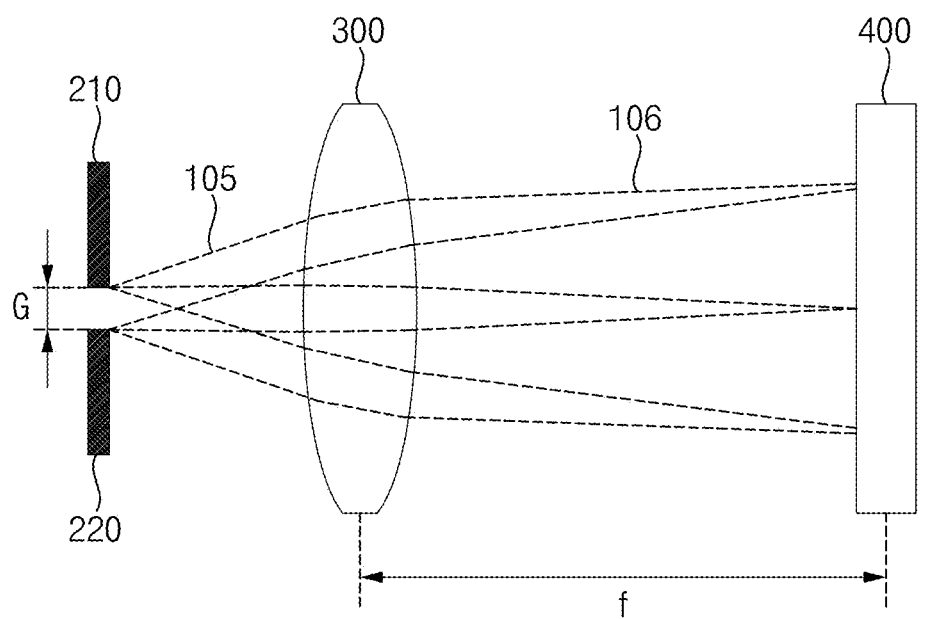
FIG. 2 is a schematic view illustrating a light path of FIG. 1.
Figure 3:
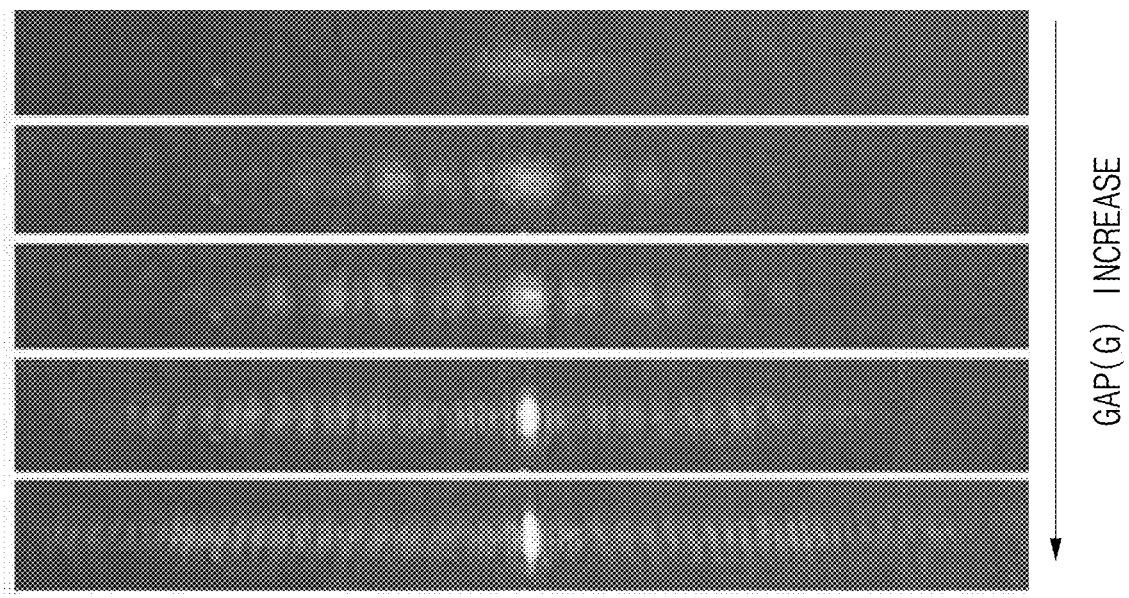
FIG. 3 is an image showing a light image measured in a sensing part of FIG. 2.
Figure 4:
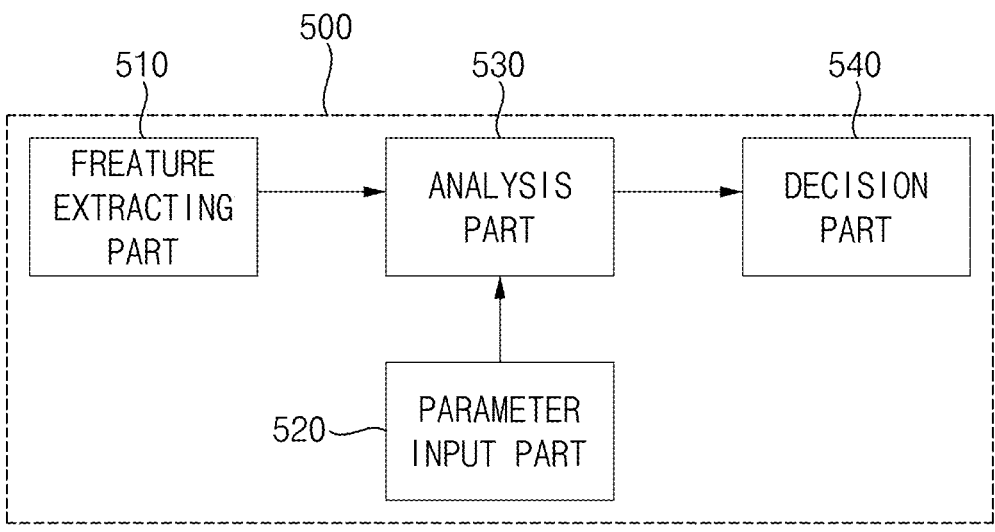
FIG. 4 is a block diagram illustrating an image processing part of FIG. 1.

FIG. 1 is a schematic view illustrating a roller gap measurement system according to an example embodiment of the present invention. FIG. 2 is a schematic view illustrating a light path of FIG. 1. FIG. 3 is an image showing a light image measured in a sensing part of FIG. 2. FIG. 4 is a block diagram illustrating an image processing part of FIG. 1.

Referring to FIG. 1 to FIG. 4, the roller gap measurement system 10 (hereinafter, the measurement system) according to the present example embodiment measures a gap G between first and second rollers which are spaced apart from each other.

Here, a roller part 200 having the first and second rollers 210 and 220 is a roller used in a roll-to-roll processing equipment, and a process product such as a substrate is continuously provided to the gap between the first and second rollers 210 and 220.

Thus, the measurement for the gap G is required for maintaining a thickness of the process product uniformly or maintaining the thickness of the process product to be a required thickness. Then, the measurement system 10 according to the present example embodiment is used for measuring the gap G.

Here, the measurement system 10 includes a light source 100, a refractive part 300, a sensor part 400 and an image processing part 500.

The light source 100 generated a light, and the light from the light source 100 may be a monochromatic laser such as He—Ne laser beam.

The light generated from the light source 100 is an incident light 101, and advances along a first direction X and then is incident into the gap G between the first and second rollers 210 and 220.

Here, as illustrated in FIG. 2, when the incident light 101 is provided into the gap G between the first and second rollers 210 and 220, this may be assumed to be a single slit model for the gap G.

Thus, the incident light 101 is formed to be a complex light 105 while passing through the gap G, and in the present example embodiment, the complex light 105 is incident into the refractive part 300.

Here, the incident light 101 is diffracted, transmitted, reflected or scattered with passing through the gap G, and the complex light 105 is defined as the light in which the diffraction, the transmission, the reflection and the scattering are generated complicatedly.

The light passing through the gap G may be variously diffracted, transmitted, reflected or scattered according to the size of the gap G or various features of the incident light 101. Thus, these complicated phenomena have a combined effect to form the complex light 105.

The refractive part 300 may be, for example a convex lens, and the complex light 105 incident into the refractive part 300 is provided to the sensor part 400 which is located spaced apart from the refractive part 300 by a focal distance f.

The complex light 105 passes through the refractive part 300 to be a refractive light 106, and the refractive part 300 is spaced apart from the sensor part 400 by the focal distance f of the refractive part 300, so that the refractive light 106 reaches the sensor part 400 with being focused on the sensor part 400.

The sensor part 400 receives the refractive light 106 and images a complex pattern. The refractive light 106 focuses the complex light 105, and includes the complex pattern included in the complex light 105. Thus, the sensor part 400 images the complex pattern included in the refractive light 106 and forms a predetermined pattern.

Here, the complex pattern imaged in the sensor part 400 may be a Fraunhofer diffraction pattern.

As illustrated in FIG. 3, the complex pattern imaged by the sensor part 400 is changed according as the gap G between the first and second rollers 210 and 220 changes.

Here, the complex pattern imaged by the sensor part 400 is changed according to a change of the gap G and may be changed according to various kinds of parameters, which will be explained below.

In the present example embodiment, the imaged pattern is explained as the complex pattern. In the complex pattern, complicated effects such as the diffraction, the transmission, the reflection and the scattering may be mixed while the incident light passing through the gap G, and the complex pattern is defined as the pattern generated by the above complicated effects.

The image processing part 500 obtains a gap G information between the first and second rollers 210 and 220 from the imaged complex pattern in the sensor part 400.

For example, as illustrated in FIG. 4, the image processing part 500 includes a feature extracting part 510, a parameter input part 520, an analysis part 530 and a decision part 540.

The feature extracting part 510 extracts the feature of the pattern from the imaged complex pattern. As illustrated in FIG. 3, the features of the complex pattern changed according to the increase of the gap G may be directly extracted.

The feature extracting part 510 may divide and extract the features of the pattern of the imaged complex pattern, the features of the distance between the patterns, the features of the size or the shape of each pattern and so on.

For example, the feature extracting part 510 may extract the features of the interference pattern due to the image complex based on a frequency analysis using Fast Fourier Transform and so on. The feature extracting part 510 analyzes the imaged complex pattern via the Fast Fourier Transform, to extract the features of the interference pattern.

Alternatively, the feature extracting part 510 extracts features by using a moment such as a center of gravity of the image and an intensity ratio between the center and the side parts of the image. The feature extracting part 510 may extracts features based on the intensity ratio between the center and the side parts of the image, on the imaged complex pattern.

Further, the feature extracting part 510 may extract the features using an amount of the light reaching the sensor part 400, based on the sum of the intensity. The feature extracting part 510 may extract the features based on the sum of the intensity, on the imaged complex pattern.

The features of the imaged complex pattern include the features changed according to the change of the gap G and further may be changed by various kinds of elements affecting the forming of the complex light 105.

Thus, in the present example embodiment, the features according to the gap G are obtained from the features extracted by the feature extracting part 510, considering the parameters affecting the complex pattern additionally.

For the above process, the parameters except for the gap G among the parameters affecting the complex pattern are inputted by the parameter input part 520. Examples of the parameters may include at least one of an alignment error between the first and second rollers 210 and 220, a radius of each of the first and second rollers 210 and 220, a deformation error and a surface roughness.

However, the parameters except for the gap G have pre-known values and the values of the parameters are not changed and uniformed maintained. Thus, in the present example embodiment, if the effect of the parameters except for the gap G on the complex pattern is pre-analyzed, the features generated by the effects of the parameters except for the gag G in the actually obtained complex pattern are removed, and then the features generated due to the gap G may be extracted.

Accordingly, the analysis part 530 finally obtains the features of the complex pattern duet to the gap G from the extracted features of the complex pattern, considering the features due to the effect of the parameters except for the gap G.

To obtain the features due to the effect of the parameters except for the gap G previously, the features of the complex pattern may be analyzed proactively.

For example, the above explained parameters are pre-obtained and have constant values, and thus the features of the complex pattern included in the complex light 105 are analyzed while positioning the first and second rollers 210 and 220 to have a predetermined gap G with the information of the above parameters.

Further, the analysis of the features of the complex pattern is performed repeatedly with changing the gap G between the first and second rollers 210 and 220 variously, and then the features due to the effect of the parameters except for the gap G may be previously obtained.

Accordingly, the analysis part 530 obtains the features of the pattern due to the gap G from the complex pattern, considering the effect of the parameters except for the gap G on the complex pattern.

Then, the decision part 540 obtains the information of the gap G from the features obtained in the analysis part 530. Here, the information obtained in the decision part 540 may be an absolute value information on the size or distance of the gap G, and alternatively may be a relative value information thereon.

When the obtained information on the size of the gap G is the relative value information, the relative value may be additionally corrected to be the absolute value, based on the results on the gap G in the above complex pattern feature analysis variously.

Accordingly, via the image processing part 500, the gap G information between the first and second rollers 210 and 220 is obtained based on the complex pattern imaged in the sensor part 400.

The gap G information between the first and second rollers 210 and 220 may be obtained via a non-contact method using the light, and thus the gap G may be effectively measured even if the gap G between the first and second rollers 210 and 220 is very narrow.

Figure 5:
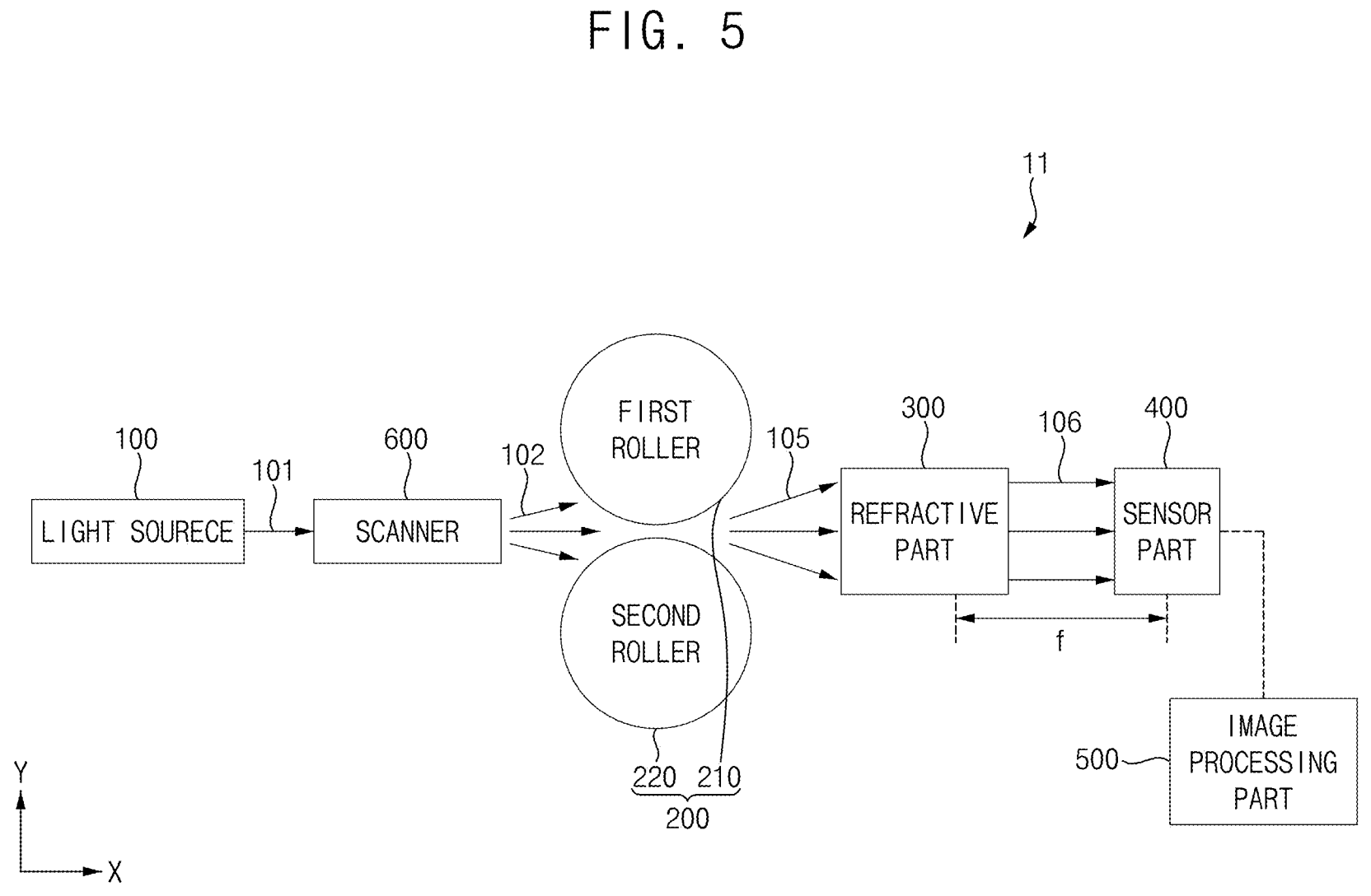
Figure 6:
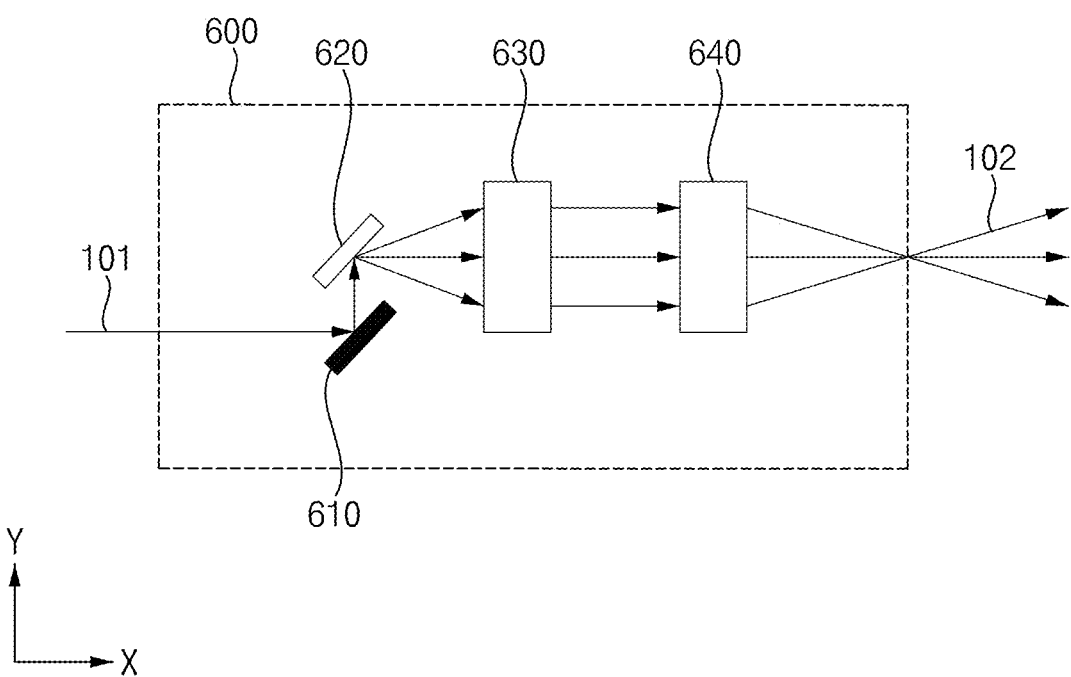
FIG. 6 is a schematic view illustrating a scanner of FIG. 5.

FIG. 5 is a schematic view illustrating a roller gap measurement system according to another example embodiment of the present invention. FIG. 6 is a schematic view illustrating a scanner of FIG. 5.

The roller gap measurement system 11 according to the present example embodiment is substantially same as the measurement system 10 of FIG. 1 to FIG. 14, except for a scanner 600 additionally configured between the light source 100 and the roller part 200, and thus same reference numerals are used for the same elements and any repetitive explanation will be omitted.

Referring to FIG. 5 and FIG. 6, the measurement system 11 according to the present example embodiment further includes the scanner 600.

Here, the scanner 600 is disposed between the light source 100 and the roller part 200, and the scanner 600 scans the incident light 101 provided from the light source 100. Then, a scan light 102 is provided to the gap G between the first and second rollers 210 and 220.

The scanner 600 may include first and second mirrors 610 and 620, and first and second lenses 630 and 640.

Thus, the incident light 101 advances along the first direction X and the incident light 101 is incident into the first mirror 610. Then, the incident light 101 is reflected by the first mirror 610 and advances along a second direction Y substantially perpendicular to the first direction X.

Then, the light is reflected by the second mirror 620 again and advances along the first direction X again, and then passes through the first and second lenses 630 and 640 to be the scan light. Here, each of the first and second lenses 630 and 640 may be a convex lens.

Here, the combination of the mirrors and the lenses of the scanner 600 may be variously changed, and it is enough for the scanner 600 to scan the incident light 101 and then to provide the scan light 102 along the first direction X.

Accordingly, the scan light 102 is provided to the roller part 200 by the scanner 600, and thus additional information generated due to the shape difference between the single slit model and the gap G of the roller part 200 may be obtained.

The state in which the incident light 101 passes through the gap G and is combined may be assumed as, for example, a light complex phenomenon due to a single slit pattern, but the error may be generated by the difference between the single slit model and the actual shape of the gap G between the first and second rollers 210 and 220.

Thus, in the present example embodiment, the scan light provided by scanning in the vertical direction is provided to the gap G between the first and second rollers 210 and 220, and thus the information on the error generated due to the shape difference may be additionally obtained. Thus, the measurement results on the gap G may be obtained more accurately.

Figure 7:
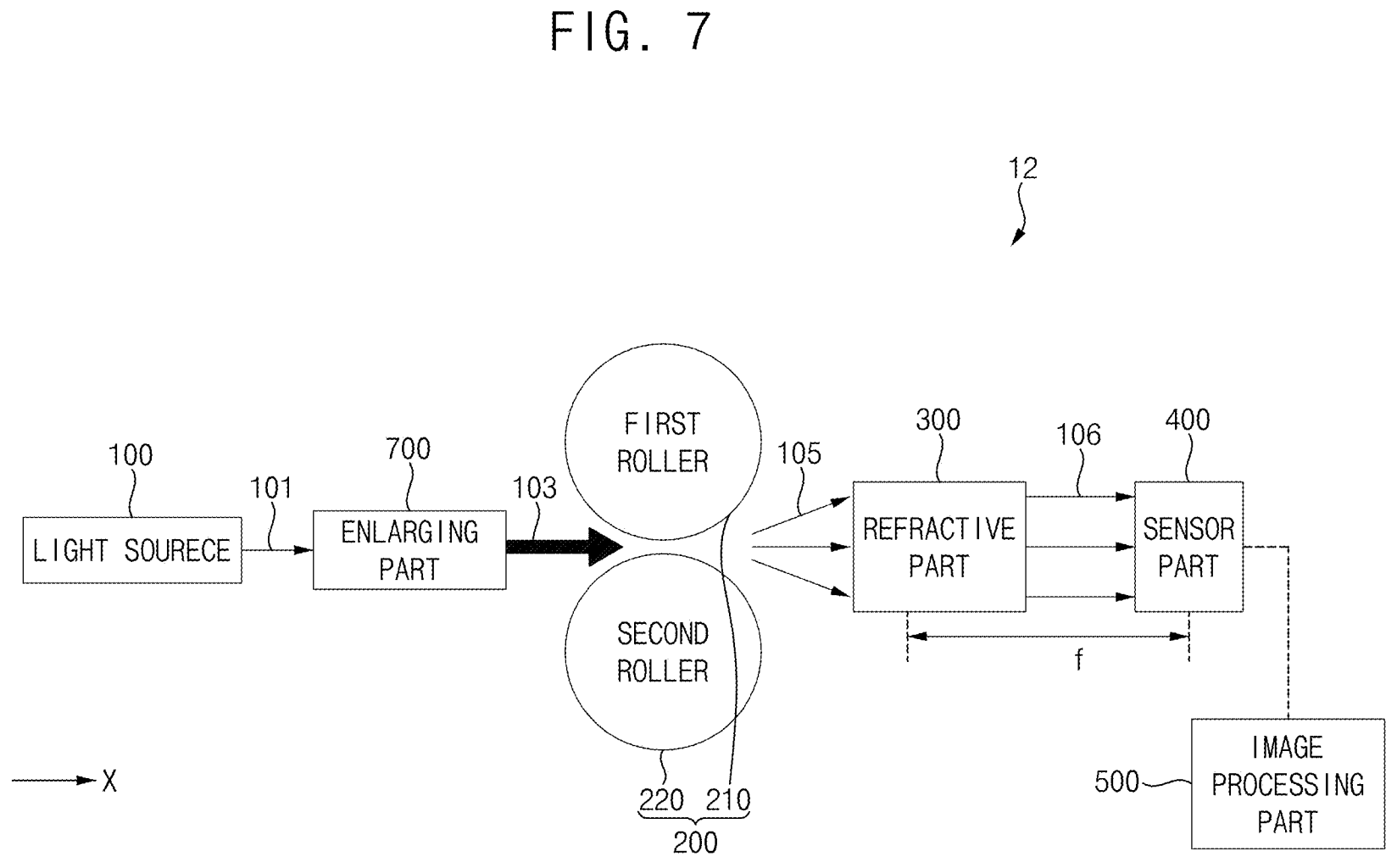

FIG. 7 is a schematic view illustrating a roller gap measurement system according to still another example embodiment of the present invention.

The roller gap measurement system 12 according to the present example embodiment is substantially same as the measurement system 100 of FIG. 1 to FIG. 4, except for an enlarged part 700 configured between the light source 100 and the roller part 200, and thus the same reference numerals are used for the same elements and any repetitive explanation will be omitted.

Referring to FIG. 7, the measurement system 12 according to the present example embodiment further includes the enlarged part 700.

The enlarged part 700 enlarges the size of the incident light 101, and the size of the incident light 101 passing through the enlarged part 700 is increased to be an enlarged light 103. Then, the enlarged light 103 is provided to the gap G between the first and second rollers 210 and 220.

Here, the meaning of the increase of the light may be an increase of a width of the incident light.

Thus, when the size of the incident light 101 is smaller than the size of the gap G between the first and second rollers 210 and 220, the size of the light incident into the enlarged part 700 is increased, and thus the complex pattern may be generated more easily when passing through the gap G.

FIG. 8 is a schematic view illustrating a roller gap measurement system according to still another example embodiment of the present invention.

The roller gap measurement system 13 according to the present example embodiment is substantially same as the measurement system 100 of FIG. 1 to FIG. 4, except for the enlarged part 700 and the scanner 600 both configured between the light source 100 and the roller part 200, and thus the same reference numerals are used for the same elements and any repetitive explanation will be omitted.

Referring to FIG. 8, the measurement system 13 according to the present example embodiment further includes the enlarged part 700 and the scanner 600.

The enlarged part 700 enlarges the incident light 101 and then provides the enlarged light 103, and the scanner 600 scans the incident enlarged light 103 in the vertical direction and then provides the scan light 102.

Here, the detailed functions and structures of the enlarged part 700 are substantially same as those explained referring to FIG. 7, and the detained functions and structures of the scanner 600 are substantially same as those explained referring to FIG. 5 and FIG. 6, and thus any repetitive explanation will be omitted.

Hereinafter, a roller gap measurement method using the measurement systems 10, 11, 12 and 13 according to the previous example embodiments is explained briefly.

FIG. 9 is a flow chart illustrating a roller gap measurement method using the roller gap measurement systems of FIG. 1, FIG. 5, FIG. 7 and FIG. 8.

Referring to FIG. 9, in the measurement method, first, the incident light 101 is provided from the light source 100 (step S10).

The incident light 101 may be directly provided to the gap G between the first and second rollers 210 and 220.

Here, according to the example embodiments explained above, the incident light 101 may be provided to the enlarged part 700 and the enlarged light 103 may be provided to the gap G (step S20). Alternatively, the incident light 101 may be provided to the scanner 600 and the scan light 102 may be provided to the gap G (step S30). Further, the enlarged light 103 may be provided to the scanner 600 additionally and the scan light 102 may be provided to the gap G.

Accordingly, the incident light 101 itself (referring to FIG. 1), the enlarged light 103 (referring to FIG. 7), the scan light 102 (referring to FIG. 5), or the enlarged and scan light 102 (referring to FIG. 8) may be provided to the gap G between the first and second rollers.

Then, the lights pass through the gap G between the first and second rollers and then are to be the complex light 105. Then, the complex light 105 is refracted with passing through the refractive part 300 (step S40).

Then, the refractive light 106 passing through the refractive part 300 is focused on the sensor part 400, and the sensor part 400 images the complex pattern from the refractive light 106 (step S50).

Then, the image processing part 500 obtains the gap G information between the first and second rollers 210 and 220 based on the imaged complex pattern (step S60).

Here, the image of the complex pattern in the sensor part 400, and the obtainment of the gap G information in the image processing part 500 are already explained above, and any repetitive explanation will be omitted.

According to the present example embodiments, by measuring the gap between a pair of rollers in a non-contact method, accurate and effective measurement is possible even when the gap between the rollers is relatively very narrow. In particular, the gap in the center of the rollers may be effectively measured, and the gap in the center of the rollers, which affects the thickness of the workpiece that actually passes between the rollers, may be effectively controlled.

Here, assuming that the gap between the rollers is a single slit model, information on the gap is derived based on the complex pattern of the light passing through the single slit. Accurate gap measurement may be possible using the non-contact method.

In addition, the gap information may be obtained by extracting features from the complex pattern, but by taking into account the effects of various parameters that affect the actual complex pattern, the gap information may be obtained directly from the features of the complex pattern.

In other words, by considering and excluding in advance the influence of parameters other than the gap on the complex pattern, the features of the complex pattern according to the difference in the gap may be derived, and the gap information may be obtained based on this. Thus, from the features of the complex pattern that varies due to differences in a fine gap, the fine gap information may be obtained more accurately.

In addition, by scanning the incident light and providing the scan light between the rollers, if there is a difference between the assumed single slit model and the actual gap, information about the gap may be obtained more accurately.

Furthermore, by providing enlarged light between the rollers through the enlarging part, information about the gap between the rollers may be obtained even when the gap between the rollers is larger than the size of the light source. Thus, gap information may be obtained for gaps of various sizes using the single light source.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A roller gap measurement system configured for measuring a gap between a pair of first and second rollers, the system comprising:

a light source configured to provide an incident light toward the gap between the first and second rollers;

a refractive part configured to receive a light passing through the gap between the first and second rollers, and configured to refract the light passing through the gap;

a sensor part configured to receive the refracted light and configured to image a pattern; and a processor configured to obtain a gap information between the first and second rollers, based on the imaged pattern, wherein the processor is configured to obtain the gap information based on the features of a pattern due to a gap, considering parameters affecting the imaged pattern except for the gap.

2. The system of claim 1, wherein the light source is configured to provide a monochromatic laser.

3. The system of claim 1, wherein the incident light provided from the light source is diffracted, transmitted, reflected or scattered with passing through the gap between the first and second rollers.

4. The system of claim 1, wherein the pattern imaged in the sensor part is a Fraunhofer diffraction pattern.

5. The system of claim 1, wherein the sensor part is located spaced apart from the refractive part by a focal length of the refractive part.

6. The system of claim 1, wherein the processor is configured to:

extract the features of an interference pattern via a frequency analysis on the imaged pattern, extract the features based on an intensity ratio between a central portion of the imaged pattern and a side portion of the imaged pattern on the imaged pattern, or extract the features based on a sum of intensity on the imaged pattern.

7. The system of claim 1, wherein an enlarged light generated by enlarging the incident light is provided when the gap between the first and second rollers is larger than a size of the light source.

8. The system of claim 1, further comprising:

a scanner disposed between the light source and the first and second rollers, and configured to scan the incident light and to provide a scan light.

9. The system of claim 8, wherein the scanner is configured to provide the scan light in which the incident light is scanned along a direction perpendicular to an advancing direction of the incident light, wherein an information on the difference between a single slit model and an actual gap between the first and second rollers is obtained according as the scan light is provided.

10. The system of claim 9, wherein the scanner comprises a pair of first and second lenses, each of which is a convex lens, wherein the incident light passes through the first and second lenses to be a scan light.

11. The system of claim 1, wherein the processor is configured to:

extract the features of the pattern from the imaged pattern;

receive parameters affecting the pattern, except for the gap;

obtain the features of the pattern due to the gap from the extracted pattern, considering an effect by the parameters; and obtain the gap information, based on the obtained pattern features.

12. The system of claim 11, wherein the gap information obtained in the processor is an absolute value information or a relative value information on a size of the gap.

13. The system of claim 11, wherein the parameters except for the gap are pre-known values which are uniformly maintained without being changed.

14. The system of claim 13, wherein the effect of the parameters except for the gap on the extracted pattern is pre-analyzed and stored, wherein the processor is configured to obtain the features of the pattern due to the gap, considering the pre-analyzed and stored effect.

15. The system of claim 13, wherein the parameters comprise at least one of an alignment error between the first and second rollers, a radius of each of the first and second rollers, a deformation error and a surface roughness.

16. A roller gap measurement method comprising:

providing an incident light toward a gap between first and second rollers from a light source;

receiving and refracting a light passing through the gap between the first and second rollers;

receiving the refracted light and imaging a pattern; and obtaining a gap information between the first and second rollers based on the imaged pattern, wherein the obtaining the gap information comprises obtaining the gap information based on the features of a pattern due to a gap, considering parameters affecting the imaged pattern except for the gap.

17. The method of claim 16, further comprising:

providing a scan light to the gap between the first and second rollers, wherein the incident light is scanned along a direction perpendicular to an advancing direction of the incident light to be the scan light.

18. The method of claim 16, further comprising:

providing an enlarged light to the gap between the first and second rollers, wherein the incident light is enlarged to be the enlarged light.

* * * * *